(12) United States Patent
Rego et al.

(10) Patent No.: US 11,063,967 B2
(45) Date of Patent: Jul. 13, 2021

(54) NETWORK THREAT INDICATOR EXTRACTION AND RESPONSE

(71) Applicant: THE BOEING COMPANY, Chicago, IL (US)

(72) Inventors: Isaac D. Rego, Renton, WA (US); Bradley R. Logan, Kent, WA (US)

(73) Assignee: THE BOEING COMPANY, Chicago, IL (US)

(*) Notice: Subject to any disclaimer, the term of this patent is extended or adjusted under 35 U.S.C. 154(b) by 257 days.

(21) Appl. No.: 16/026,629

(22) Filed: Jul. 3, 2018

(65) Prior Publication Data
US 2020/0014711 A1    Jan. 9, 2020

(51) Int. Cl.
*H04L 29/06* (2006.01)
*H04L 12/26* (2006.01)

(52) U.S. Cl.
CPC ........ *H04L 63/1425* (2013.01); *H04L 43/045* (2013.01); *H04L 43/062* (2013.01); *H04L 63/1441* (2013.01)

(58) Field of Classification Search
CPC . H04L 43/045; H04L 43/062; H04L 63/1433; H04L 63/1425; H04L 63/1408; H04L 63/0227; H04L 63/1441
USPC ........................................................ 726/22
See application file for complete search history.

(56) References Cited

U.S. PATENT DOCUMENTS

| | | | |
|---|---|---|---|
| 9,258,321 B2* | 2/2016 | Amsler | H04L 63/20 |
| 10,447,733 B2* | 10/2019 | DiValentin | H04L 63/1491 |
| 10,511,621 B1* | 12/2019 | Thomson | H04L 63/1433 |
| 10,616,258 B2* | 4/2020 | Liang | H04L 63/1433 |
| 2012/0144492 A1 | 6/2012 | Griffin et al. | |
| 2012/0260342 A1 | 10/2012 | Dube et al. | |
| 2014/0007238 A1 | 1/2014 | Magee et al. | |
| 2016/0226895 A1 | 8/2016 | Huang et al. | |
| 2018/0069888 A1 | 3/2018 | Muddu et al. | |

OTHER PUBLICATIONS

Extended European Search Report dated Aug. 19, 2019 issued in corresponding Application No. EP19184239, 11 pgs.

(Continued)

*Primary Examiner* — Kambiz Zand
*Assistant Examiner* — Benjamin A Kaplan
(74) *Attorney, Agent, or Firm* — Moore Intellectual Property Law, PLLC

(57) ABSTRACT

A device includes a communication interface and a processor. The communication interface is configured to receive a network threat report. The processor is configured to extract an indicator from the network threat report. The indicator is reported to be associated with a network threat. The processor is also configured to determine, based on the indicator, a confidence score indicating a likelihood that the indicator is associated with malicious activity. The processor is further configured to determine, based on the indicator, an impact score indicating a potential severity of the malicious activity. The processor is further configured to identify, based on the indicator, the confidence score, and the impact score, an action to be performed. The action includes blocking network traffic corresponding to the indicator or monitoring network traffic corresponding to the indicator. The processor is also configured to initiate performance of the action.

20 Claims, 7 Drawing Sheets

(56) References Cited

OTHER PUBLICATIONS

"Indicators of Compromise," National Cyber Security Center, Ministry of Security and Justice, Factsheet FS-2016-02, Version 1, Jun. 1, 2017, 6 pgs.
"Kill Chain," Lockheed Martin <https://www.globaldatavault.com/blog/cyber-kill-chain/> downloaded May 31, 2018, 1 pg.
Greitzer, F. L. et al., "Methods and Metrics for Evaluating Anayltic Insider Threat Tools," 2013 IEEE Security and Privacy Workshops, IEEE Computer Society, pp. 90-97.
Communication pursuant to Article 94(3) EPC dated Nov. 9, 2020 issued in corresponding Application No. EP19184239, pp. 1-4.

* cited by examiner

| Properties 105 | Property Values 290 | Confidence/Impact/Action Values 292 |
|---|---|---|
| First Seen Date 201 | 3/12/2018 4:33 | Confidence |
| Last Seen Date 203 | 5/12/2018 8:23 | Confidence |
| Report Volume 205 | 451 | Both |
| Kill Chain Phase 207 | C2 | Impact |
| Attack Type 209 | Malware | Impact |
| Threat Type 211 | Malicious IP | Impact |
| Description Keywords 213 | "Scanning" | Both |
| Keyword Tags 215 | "exfil" | Both |
| Attribution Identifier 217 | Fluffy Bunny | Impact |
| Attribution Confidence 219 | High | Confidence |
| Source Count 221 | 3 | Confidence |
| Source Reputation Score 223 | High | Confidence |
| Additional Sources Data 225 | 13/52 | Both |
| First Reported Date 227 | 1/13/2018 5:11 | Confidence |
| Last Reported Date 229 | 5/23/2018 12:42 | Confidence |
| Manually Applied Actions 231 | Block – Proxy | Confidence |
| Indicator Type 233 | IP v4 Address | Impact |
| Indicator Creation Date 235 | 8/15/2018 | Confidence |
| Internal Hits 237 | 500 | Action |
| Last Internal Hit Date 239 | 4/12/2001 | Action |
| Targeted 240 | Yes | Impact |
| Registration Date 242 | 1/16/2017 | Confidence |
| False Positive Rate 244 | 33% | Confidence |

| Properties 105 | Property Values 540 |
|---|---|
| Indicator Type 233 | IPv4 Address |
| Internal Hits 237 | 0 |
| Confidence Score 107 | 7.3 |
| Impact Score 109 | 7.1 |

| Action 115 |
|---|
| Block: Proxy, Email |
| Monitor: Proxy, Email, RP, VPN, External Web Logs |

520

| Properties 105 | Property Values 550 |
|---|---|
| Indicator Type 233 | Domain Name |
| Internal Hits 237 | 100 |
| Last Internal Hit Date 239 | 04/2016 |
| Confidence Score 107 | 5.8 |
| Impact Score 109 | 7.5 |

| Action 115 |
|---|
| Block: Proxy |
| Monitor: Proxy, Email, RP, VPN, External Web Logs |

530

| Properties 105 | Property Values 560 |
|---|---|
| Indicator Type 233 | IPv4 Address |
| Internal Hits 237 | 10,000 |
| Last Internal Hit Date 239 | 2 days ago |
| Confidence Score 107 | 2.8 |
| Impact Score 109 | 1.7 |

| Action 115 |
|---|
| Block: None |
| Monitor: None |

NETWORK THREAT INDICATOR EXTRACTION AND RESPONSE

FIELD OF THE DISCLOSURE

The present disclosure is generally related to network threat indicator response.

BACKGROUND

A network security incident in an organization is often similar to network security incidents that have occurred in other organizations. Information regarding the network security incidents at other organizations can be used to enable detection and prevention of malicious network activity. Such information may be gathered from various sources with varying degrees of credibility. For example, some information may be received from a trusted network security source that publishes indicators of network threats. Other information may be gathered from anonymous user posts on public network security forums. The volume of information to be analyzed can create a backlog that delays detecting and preventing malicious network activity.

SUMMARY

In a particular implementation, a device includes a communication interface and a processor. The communication interface is configured to receive a network threat report. The processor is configured to extract an indicator from the network threat report. The indicator is reported to be associated with a network threat. The processor is also configured to determine, based on the indicator, a confidence score indicating a likelihood that the indicator is associated with malicious activity. The processor is further configured to determine, based on the indicator, an impact score indicating a potential severity of the malicious activity. The processor is further configured to identify, based on the indicator, the confidence score, and the impact score, an action to be performed. The action includes blocking network traffic corresponding to the indicator or monitoring network traffic corresponding to the indicator. The processor is also configured to initiate performance of the action.

In another particular implementation, a method includes receiving a network threat report at a device. The method also includes extracting, at the device, an indicator from the network threat report. The indicator is reported to be associated with a network threat. The method further includes determining, based on the indicator, a confidence score indicating a likelihood that the indicator is associated with malicious activity. The method also includes determining, based on the indicator, an impact score indicating a potential severity of the malicious activity. The method further includes identifying, based on the indicator, the confidence score, and the impact score, an action to be performed. The action includes blocking network traffic corresponding to the indicator or monitoring network traffic corresponding to the indicator. The method also includes initiating performance of the action.

In another particular implementation, a computer-readable storage device stores instructions that, when executed by a processor, cause the processor to perform operations including receiving a network threat report. The operations also include extracting an indicator from the network threat report. The indicator is reported to be associated with a network threat. The operations further include determining, based on the indicator, a confidence score indicating a likelihood that the indicator is associated with malicious activity. The operations also include determining, based on the indicator, an impact score indicating a potential severity of the malicious activity. The operations further include identifying, based on the indicator, the confidence score, and the impact score, an action to be performed. The action includes blocking network traffic corresponding to the indicator or monitoring network traffic corresponding to the indicator. The operations also include initiating performance of the action.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 2 is a diagram that illustrates an example of properties associated with an indicator of FIG. 1;

FIG. 5 is a diagram that illustrates examples of properties and corresponding actions;

DETAILED DESCRIPTION

Figure 1:
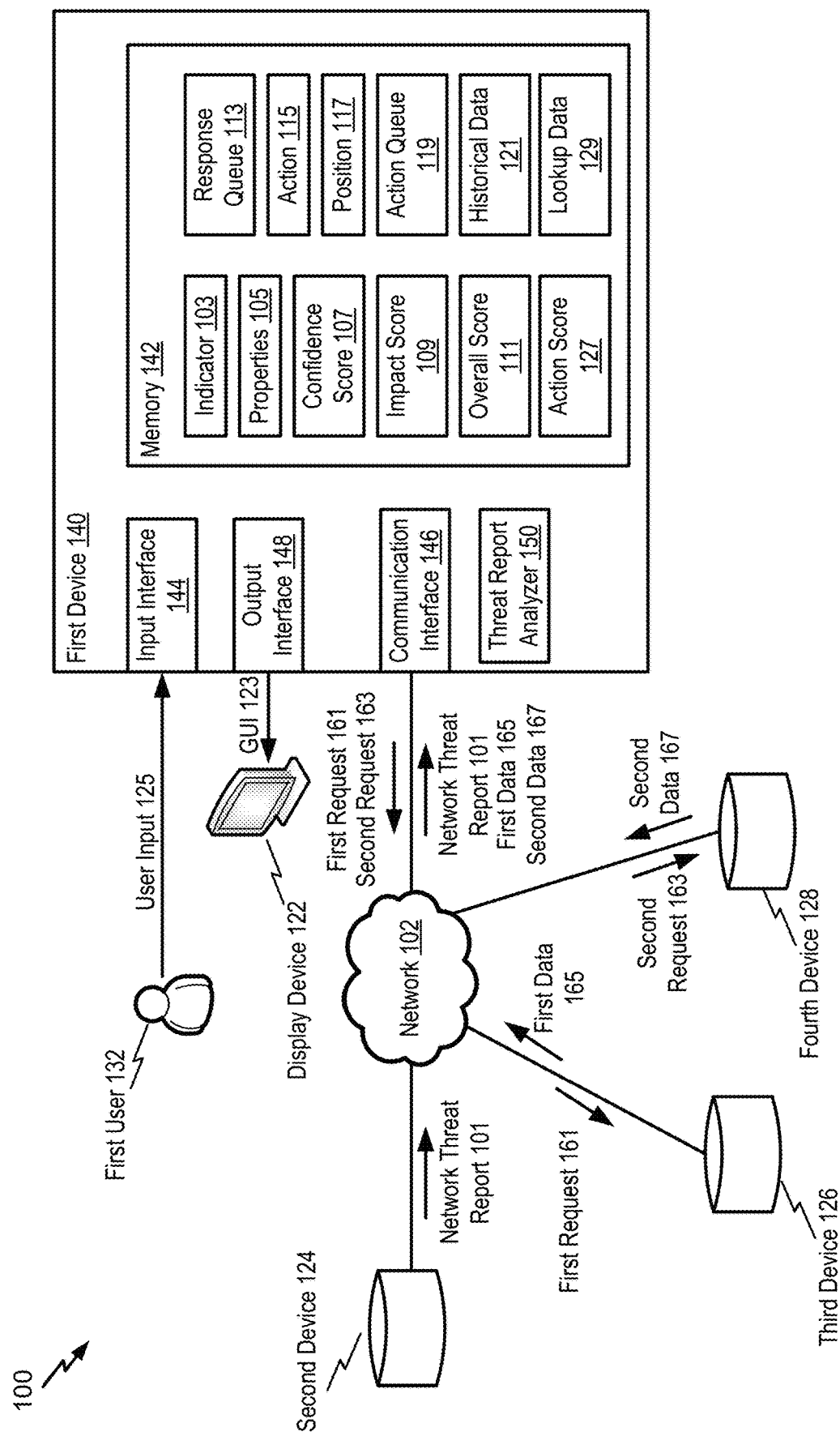
FIG. 1 is a block diagram that illustrates a system operable to perform network threat indicator extraction and response.

Implementations described herein are directed to network threat indicator extraction and response. For example, a threat report analyzer receives a network threat report from a first source. The network threat report includes one or more indicators that are reported to be associated with network threats. As an example, an indicator can include an internet protocol (IP) address that is reported to be associated with a network threat. The threat report analyzer determines properties associated with the indicator. For example, the threat report analyzer extracts at least one property from the network threat report. To illustrate, the network threat report can include an attribution identifier that indicates a reported perpetrator of the network threat. As another example, the threat report analyzer determines at least one property based on data from a second source (e.g., a trusted source). For example, the threat report analyzer sends a request to a device associated with the second source. The request includes the indicator. The threat report analyzer receives data associated with the indicator from the device. For example, the data indicates whether the second source also reports that the indicator is associated with a network threat.

The threat report analyzer determines a confidence score and an impact score based on the properties associated with the indicator. The confidence score indicates a likelihood of the indicator being associated with malicious activity. For example, the confidence score is higher if the second source also reports that the indicator is associated with a network threat. The impact score indicates a potential severity of the malicious activity. For example, the impact score is higher if the attribution identifier attributes the indicator to a party that is known to perpetrate harmful and/or widespread network threats.

The threat report analyzer determines, based on the confidence score and the impact score, a position of the indicator in a response queue and adds the indicator at the position in the response queue. The response queue indicates an order in which indicators are to be processed for corresponding actions, if any, to be taken. The position of the indicator in the response queue indicates a priority of the indicator. An indicator with a higher priority is processed earlier. In some examples, the response queue has a particular capacity. When the response queue is filled to capacity, the threat report analyzer may remove a lower priority indicator from the response queue prior to adding a higher priority indicator to the response queue.

The threat report analyzer retrieves the indicator from the response queue in response to determining that the indicator is a next indicator to be processed in the response queue. The threat report analyzer identifies, based on the confidence score and the impact score, an action to be performed. For example, the action includes monitoring network traffic corresponding to the indicator or blocking network traffic corresponding to the indicator. In a particular example, the threat report analyzer identifies the action to be performed in response to retrieving the indicator from the response queue. In another example, the threat report analyzer identifies the action to be performed independently of adding the indicator to the response queue. The threat report analyzer initiates performance of the action. In a particular example, the action is performed independently of receiving user input indicating that the action is to be performed.

Indicators with a higher likelihood of being associated with malicious activity and/or indicators that indicate higher potential severity of malicious activity are processed earlier. Faster searching of (or access to) higher priority indicators improves computer functionality by enabling the threat report analyzer to prevent or reduce an impact of the corresponding malicious activity. Prioritizing the indicators based on the confidence score and the impact score increases an accuracy of the priority calculation as compared to a subjective determination of indicator priority. The threat report analyzer enables filtering of internet traffic that can be customized based on rules associated with computing the confidence score and the impact score for particular properties of indicators. Performing the action automatically (e.g., without receiving user input indicating that the action is to be performed) reduces (e.g., eliminates) a mean time to respond to malicious activity.

FIG. 1 is a block diagram of a system 100 that is operable to perform network threat indicator extraction and response. The system 100 includes a first device 140 that is coupled via a network 102 to one or more devices. For example, the first device 140 is coupled via the network 102 to a second device 124, a third device 126, a fourth device 128, one or more additional devices, or a combination thereof. The first device 140 corresponds to, for example, a computer, a server, a distributed system, or a combination thereof. The network 102 includes a wired network, a wireless network, or both. One or more of the second device 124, the third device 126, or the fourth device 128 include, for example, a web server, a database, a computer, a server, a distributed system, a mobile device, a communication device, a desktop computer, a laptop, a tablet computer, or a combination thereof. The first device 140 is coupled via a communication interface 146 to the network 102.

It should be noted that in the following description, various functions performed by the system 100 of FIG. 1 are described as being performed by certain components or modules. However, this division of components and modules is for illustration only. In an alternate aspect, a function described herein as performed by a particular component or module may be divided amongst multiple components or modules. Moreover, in an alternate aspect, two or more components or modules of FIG. 1 may be integrated into a single component or module. Each component or module illustrated in FIG. 1 can be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The first device 140 is coupled via an output interface 148 to a display device 122. The first device 140 includes a memory 142. The first device 140 includes an input interface 144. The input interface 144 is coupled to one or more input devices, such as a touchscreen, a mouse, a keyboard, a microphone, a camera, or a combination thereof. The first device 140 includes a threat report analyzer 150 (e.g., a processor). The threat report analyzer 150 is configured to analyze a network threat report 101.

During operation, the first device 140 receives the network threat report 101, via the communication interface 146, from the second device 124. In a particular aspect, the second device 124 is associated with a first source, such as a particular website, a particular organization, a third-party, or a combination thereof. As an example, the network threat report 101 could include user posts on a web forum that discuss network security issues. As another example, the network threat report 101 could include reports of network threats published by a network security organization. The threat report analyzer 150 can receive reports from many different sources concurrently. In a particular implementation, the threat report analyzer 150 uses web-scraping techniques to generate network threat reports from various sources. For example, the threat report analyzer 150 generates the network threat report 101 by extracting data from web pages hosted by the second device 124. In a particular implementation, the threat report analyzer 150 subscribes to receive network threat reports from various sources. For example, the threat report analyzer 150 subscribes to a service offered by the first source and receives the network threat report 101 from the second device 124 as part of the subscription. In a particular aspect, the first source includes a third-party (e.g., a business entity, a security expert, or both) that monitors network threats and publishes network threat reports (e.g., the network threat report 101). The network threats are caused by one or more perpetrators. The first device 140 receives the network threat reports (e.g., the network threat report 101) generated by the first source from the second device 124.

The threat report analyzer 150 extracts one or more indicators from the network threat report 101. For example, the threat report analyzer 150 extracts an indicator 103 from the network threat report 101. In a particular aspect, the network threat report 101 includes text (e.g., natural or unstructured language). In this aspect, the threat report analyzer 150 extracts the indicator 103 from the network threat report 101 by performing a keyword search, natural language processing, etc. For example, the threat report analyzer 150 detects a particular keyword (or phrase) in the network threat report 101 by performing a keyword search (or natural language processing) and extracts the indicator 103 from the network threat report 101 based on detecting the particular keyword (or phrase). In a particular aspect, the network threat report 101 is formatted or structured (e.g., includes key-value pairs). In this aspect, the threat report analyzer 150 extracts the indicator 103 from the network threat report 101 by parsing the network threat report 101 based on the corresponding format or structure. For example, the threat report analyzer 150 extracts a particular element (e.g., a value of a particular key-value pair) from the network threat report 101 as the indicator 103. The network threat report 101 indicates that the indicator 103 is reported to be associated with a network threat. For example, an organization reports that the indicator 103 is associated with a network threat. As another example, a user posts the indicator 103 in a network security forum. In a particular implementation, the indicator 103 corresponds to an indicator of compromise (IOC). An IOC includes an artifact (i.e., an observable feature) that indicates a network threat (e.g., a computer intrusion). The indicator 103 includes, but is not limited to, an internet protocol (IP) address, a virus signature, an e-mail address, an e-mail subject, a domain name, a uniform resource identifier (URI), a uniform resource locator (URL), a filename, a message digest algorithm 5 (MD5) hash, a file path, or a combination thereof.

The threat report analyzer 150 determines one or more properties 105 associated with the indicator 103. The properties 105 include, for example, an indicator type, a threat type, an attack type, a registration date, a first seen date, a last seen date, a first reported date, a last reported date, a report source, a particular keyword, a kill chain phase, an attribution identifier, an attribution confidence, a report volume, a false positive rate, another property, or a combination thereof, as further described with reference to FIG. 2.

In a particular aspect, the threat report analyzer 150 extracts at least some of the properties 105 from the network threat report 101. For example, the threat report analyzer 150 extracts the indicator type, the threat type, the attack type, the registration date, the first seen date, the last seen date, the first reported date, the last reported date, the report source, the particular keyword, the kill chain phase, the attribution identifier, the attribution confidence, or a combination thereof, from the network threat report 101.

In a particular aspect, the threat report analyzer 150 receives additional data associated with the indicator 103. For example, the threat report analyzer 150 sends a first request 161 to the third device 126. In a particular aspect, the third device 126 is associated with a second source (e.g., a first trusted source). The first request 161 includes the indicator 103. The third device 126 sends first data 165 to the first device 140 responsive to the first request 161. The first data 165 is associated with the indicator 103. For example, the first data 165 indicates whether the second source has reports of a network threat associated with the indicator 103.

In a particular aspect, the threat report analyzer 150 receives additional data associated with the indicator 103 from multiple additional sources. For example, the threat report analyzer 150 sends a second request 163 to the fourth device 128. In a particular aspect, the fourth device 128 is associated with a third source (e.g., a second trusted source). The fourth device 128, in response to receiving the second request 163 including the indicator 103, sends second data 167 to the first device 140. The second data 167 is associated with the indicator 103. For example, the first data 165 indicates whether the third source has reports of a network threat associated with the indicator 103.

In a particular aspect, the threat report analyzer 150 has access to additional data associated with the indicator 103. For example, historical data 121 is stored in the memory 142. In a particular aspect, the historical data 121 corresponds to logs, such as system logs, network logs, or both. To illustrate, the historical data 121 indicates a number of accesses to a domain name indicated by the indicator 103. As another example, lookup data 129 (e.g., a table) is stored in the memory 142. The lookup data 129 includes, as an example, configuration settings, default values, user input, or a combination thereof. To illustrate, the lookup data 129 indicates that a particular keyword is associated with a particular score for calculating the confidence score 107, the impact score 109, or both, as further described with reference to FIGS. 2-4.

In a particular aspect, the threat report analyzer 150 determines at least some of the properties 105 based on the first data 165, the second data 167, the historical data 121, or a combination thereof. For example, the threat report analyzer 150 determines a report volume, a false positive rate, or both, as further described with reference to FIG. 2.

The threat report analyzer 150 determines a confidence score 107 based on the properties 105, as further described with reference to FIG. 3. The confidence score 107 indicates a likelihood that the indicator 103 is associated with malicious activity. For example, the confidence score 107 indicates a higher likelihood that the indicator 103 is associated with malicious activity if the indicator 103 is reported as associated with a network threat by a more trusted source (e.g., an organization that publishes network threat indicators) as compared to an anonymous source (e.g., an anonymous user on a public forum). To illustrate, the anonymous source could be incorrectly (or maliciously) reporting the indicator 103 as associated with a network threat. If the more trusted source is reporting the indicator 103 as associated with a network threat, the likelihood is higher that the indicator 103 is associated with potential malicious activity.

The threat report analyzer 150 determines an impact score 109 based on the properties 105, as further described with reference to FIG. 4. The impact score 109 indicates a potential severity of malicious activity associated with the indicator 103. For example, if the effect of the malicious activity associated with the indicator 103 is likely to be more damaging, more widespread, or both, the malicious activity has a higher potential severity. A particular kill chain phase of a kill chain, such as a cyber kill chain® (a registered trademark of Lockheed Martin Corp., Maryland), is associated with the indicator 103. The particular kill chain phase indicates a likely effect of the malicious activity associated with the indicator 103. For example, malicious activity for the indicator 103 associated with a first kill chain phase (e.g., reconnaissance) is likely to have a less damaging and/or less widespread effect as compared to malicious activity for the indicator 103 associated with a second kill chain phase (e.g., command and control). The impact score 109 indicates a higher severity for the second kill chain phase (e.g., command and control) as compared to the first kill chain phase (e.g., reconnaissance).

The threat report analyzer 150 determines an overall score 111 of the indicator 103 based on the confidence score 107, the impact score 109, or both. In a particular example, the overall score 111 corresponds to a weighted sum of the confidence score 107 and the impact score 109. The overall score 111 indicates a first priority of the indicator 103.

The threat report analyzer 150 is configured to add indicators to a response queue 113 in order of their overall scores. For example, the threat report analyzer 150 determines a position 117 in the response queue 113 based on the overall score 111. The threat report analyzer 150 adds the indicator 103 at the position 117 in the response queue 113. In a particular aspect, the position 117 in the response queue 113 is empty and the threat report analyzer 150 adds the indicator 103 at the position 117. In an alternate aspect, the position 117 in the response queue 113 is occupied by another indicator that has a lower overall score than the overall score of the indicator 103. The threat report analyzer 150 updates (e.g., increments by 1) positions of indicators at and subsequent to the position 117 and adds the indicator 103 at the position 117. In a particular example, the response queue 113 has a particular capacity. The threat report analyzer 150, in response to determining that the response queue 113 is filled to capacity, removes a second indicator from (e.g., the last position of) the response queue 113 prior to adding the indicator 103 to the response queue 113 at the position 117. Removing lower priority indicators enables the response queue 113 to have a lower memory footprint compared to storing all indicators in the memory 142.

The threat report analyzer 150 generates a graphical user interface (GUI) 123. The GUI 123 indicates one or more of a portion of the network threat report 101, the indicator 103, one or more of the properties 105, the confidence score 107, the impact score 109, the overall score 111, the position 117, or the response queue 113. In a particular implementation, the threat report analyzer 150 generates the GUI 123 in response to adding the indicator 103 to the response queue 113. In another implementation, the threat report analyzer 150 generates the GUI 123 in response to receiving a user input 125 from a first user 132 (e.g., a network administrator) requesting information regarding updates to the response queue 113. In a particular aspect, the first user 132 provides the user input 125 indicating an update to data associated with the indicator 103 and the threat report analyzer 150 updates the data. For example, the user input 125 indicates at least one of an updated position, an updated property, an updated confidence score 107, an updated impact score 109, or an updated overall score 111. The threat report analyzer 150, in response to receiving the user input 125, updates the position 117, the properties 105, the confidence score 107, the impact score 109, and the overall score 111 to indicate the updated position, the updated property, the updated confidence score 107, the updated impact score 109, and the updated overall score 111, respectively. In a particular aspect, the threat report analyzer 150 removes the indicator 103 from the response queue 113 in response to receiving the user input 125 indicating that the indicator 103 is to be removed from the response queue 113.

The threat report analyzer 150 is configured to process the response queue 113. For example, the threat report analyzer 150 determines that the indicator 103 is the next indicator to be processed in response to determining that a next pointer indicates the position 117. The threat report analyzer 150, in response to determining that the indicator 103 is the next indicator to be processed, retrieves the indicator 103 from the response queue 113 and updates the next pointer to indicate a position subsequent to the position 117 in the response queue 113.

The threat report analyzer 150 identifies, based on the indicator 103, an action 115 to be performed. For example, the threat report analyzer 150 identifies the action 115 based on the indicator 103, the confidence score 107, the impact score 109, or a combination thereof, as further described with reference to FIG. 5. The action 115 can include, for example, blocking network traffic associated with the indicator 103, monitoring network traffic associated with the indicator 103, or both. For example, the action 115 can include blocking network traffic from a first subdomain of a domain indicated by the indicator 103, monitoring network traffic from a second subdomain of the domain, or both. As another example, the action 115 can include blocking a first type of traffic from an IP address indicated by the indicator 103, monitoring a second type of traffic from the IP address, or both.

In a particular aspect, the threat report analyzer 150 initiates performance of the action 115 in response to identifying the action 115. In a particular implementation, the threat report analyzer 150 performs the action 115 in response to identifying the action 115. In an alternate implementation, initiating the performance of the action 115 includes scheduling a performance of the action 115. For example, the threat report analyzer 150 schedules the performance of the action 115 by adding the action 115 to the action queue 119. The threat report analyzer 150 generates (or updates) the GUI 123. The GUI 123 indicates one or more of a portion of the network threat report 101, the indicator 103, one or more of the properties 105, the confidence score 107, the impact score 109, the overall score 111, the action 115, or the action queue 119. In a particular implementation, the threat report analyzer 150 generates (or updates) the GUI 123 in response to adding the action 115 to the action queue 119. In another implementation, the threat report analyzer 150 generates (or updates) the GUI 123 in response to receiving the user input 125 from the first user 132 requesting information regarding actions added to the action queue 119.

In a particular implementation, the threat report analyzer 150 is configured to perform actions in the action queue 119 in response to receiving explicit user requests to perform corresponding actions. For example, the performance of the action 115 is initiated in response to receiving the user input 125 indicating that the action 115 is to be performed. To illustrate, the threat report analyzer 150 performs the action 115 in response to receiving the user input 125 indicating that the action 115 is to be performed. In a particular example, the first user 132 reviews the action 115 added to the action queue 119 and provides the user input 125 indicating approval of the action 115. Alternatively, the threat report analyzer 150 refrains from performing the action 115 in response to determining that the user input 125 (indicating that the action 115 is to be performed) has not been received or that the user input 125 indicates that the action 115 is not to be performed. The threat report analyzer 150, in response to receiving the user input 125 indicating that the action 115 is not to be performed, removes the action 115 from the action queue 119.

In a particular implementation, the threat report analyzer 150 is configured to perform actions in the action queue 119 unless an explicit user cancelation is received in a timely manner. For example, the threat report analyzer 150 performs the action 115 in response to determining that the user input 125 indicating that the action 115 is not to be performed has not been received. To illustrate, the threat report analyzer 150 performs the action 115 unless the first user 132 provides the user input 125 indicating that performance of the action 115 is canceled. If the threat report analyzer 150 receives the user input 125 indicating that the action 115 is not to be performed, the threat report analyzer 150 cancels performance of the action 115 by removing the action 115 from the action queue 119.

In a particular implementation, the memory 142 includes a first action queue (e.g., the action queue 119) of actions to be performed in response to an explicit user request and a second action queue (e.g., the action queue 119) of actions to be performed unless an explicit user cancelation is received. The threat report analyzer 150 determines, based on the confidence score 107, the impact score 109, the overall score 111, a type of the action 115, or a combination thereof, whether the action 115 is to be added to the first action queue (e.g., the action queue 119) or the second action queue (e.g., the action queue 119). In a particular aspect, the threat report analyzer 150 determines an action score 127 based on the confidence score 107, the impact score 109, the overall score 111, or a combination thereof The threat report analyzer 150 adds the action 115 to the second action queue (e.g., the action queue 119) in response to determining that the action score 127 is greater than a first threshold or that the action 115 is of a first type (e.g., monitor network traffic associated with the indicator 103). Alternatively, the threat report analyzer 150 adds the action 115 to the first action queue (e.g., the action queue 119) in response to determining that the action score 127 is less than or equal to the first threshold and that the action 115 is of a second type (e.g., block network traffic associated with the indicator 103).

The threat report analyzer 150 performs the action 115 from the first action queue (e.g., the action queue 119) in response to receiving the user input 125 indicating that the action 115 is to be performed. Alternatively, the threat report analyzer 150 performs the action 115 from the second action queue (e.g., the action queue 119) in response to determining that the user input 125 indicating that the action 115 is not to be performed has not been received.

The system 100 thus enables the indicator 103 to be prioritized based on the confidence score 107 and the impact score 109. The action 115 can be performed without delay for prior user approval when the action score 127 satisfies a threshold (e.g., indicating high confidence or high potential severity of the malicious activity) or when the action 115 is of a type (e.g., monitoring traffic) that is likely to cause little or no disruption to regular business activity. Harmful impact from malicious activity can thus be reduced (e.g., prevented) with little or no delay associated with waiting for user approval (e.g., in the middle of the night). Faster searching of (or access to) higher priority indicators improves computer functionality by enabling actions to be performed to prevent or reduce an impact of the corresponding malicious activity. Removing lower priority indicators enables the response queue 113 to have a lower memory footprint compared to storing all indicators in the memory 142.

Referring to FIG. 2, a table is shown and generally designated 200. A first column of the table 200 includes examples of the properties 105. A second column of the table 200 includes property values 290 as illustrative values of the examples of the properties 105 indicated in the first column. A third column of the table 200 includes examples of confidence/impact/action values 292 indicating whether the examples of the properties 105 indicated in the first column are used to determine the confidence score 107, the impact score 109, both, or the action 115. It should be understood that the properties 105 can include fewer, additional, or different properties than illustrated in the table 200. In some implementations, a particular property of the properties 105 can be used to determine the confidence score 107, the impact score 109, both, or the action 115, differently than illustrated in the table 200.

The properties 105 include a first seen date 201 (e.g., Mar. 12, 2018 4:33), a last seen date 203 (e.g., May 12, 2018 8:23), a report volume 205 (e.g., 451), a kill chain phase 207 (e.g., command and control (C2)), an attack type 209 (e.g., malware), a threat type 211 (e.g., malicious IP), one or more description keywords 213 (e.g., "scanning"), one or more keyword tags 215 (e.g., "exfil"), an attribution identifier 217 (e.g., Fluffy Bunny), an attribution confidence 219 (e.g., high), a source count 221 (e.g., 3), a source reputation score 223 (e.g., high), additional sources data 225 (e.g., 13/52), first reported date 227 (e.g., Jan. 13, 2018 5:11), last reported date 229 (e.g., May 23, 2018 12:42), one or more manually applied actions 231 (e.g., Block—Proxy), an indicator type 233 (e.g., IPv4 Address), an indicator creation date 235 (e.g., Aug. 15, 2018), internal hits 237 (e.g., 500), last internal hit date 239 (e.g., Apr. 12, 2001), targeted 240 (e.g., Yes), a registration date 242 (e.g., Jan. 16, 2017), a false positive rate 244 (e.g., 50%), an additional property, or a combination thereof.

In a particular example, the threat report analyzer 150 of FIG. 1 extracts the first seen date 201 (e.g., Mar. 12, 2018 4:33), the last seen date 203 (e.g., May 12, 2018 8:23), the report volume 205 (e.g., 451), the kill chain phase 207 (e.g., C2), the attack type 209 (e.g., malware), the threat type 211 (e.g., malicious IP), the description keywords 213 (e.g., "scanning"), the keyword tags 215 (e.g., "exfil"), the attribution identifier 217 (e.g., Fluffy Bunny), the attribution confidence 219 (e.g., high), the source count 221 (e.g., 3), the source reputation score 223 (e.g., high), the first reported date 227 (e.g., Jan. 13, 2018 5:11), the last reported date 229 (e.g., May 23, 2018 12:42), the indicator type 233 (e.g., IPv4 Address), the targeted 240 (e.g., Yes), the registration date 242 (e.g., Jan. 16, 2017), or a combination thereof, from the network threat report 101. In a particular example, the threat report analyzer 150 determines, based on the network threat report 101, the historical data 121, the first data 165, the second data 167, or a combination thereof, the additional sources data 225 (e.g., 13/52), the manually applied actions 231 (e.g., Block—Proxy), the indicator creation date 235 (e.g., Aug. 15, 2018), the internal hits 237 (e.g., 500), the last internal hit date 239 (e.g., Apr. 12, 2001), the false positive rate 244 (e.g., 50%), or a combination thereof, as described herein.

The threat report analyzer 150 can determine the confidence score 107 based on the first seen date 201 (e.g., Mar. 12, 2018 4:33), the last seen date 203 (e.g., May 12, 2018 8:23), the report volume 205 (e.g., 451), the description keywords 213 (e.g., "scanning"), the keyword tags 215 (e.g., "exfil"), the attribution confidence 219 (e.g., high), the source count 221 (e.g., 3), the source reputation score 223 (e.g., high), the additional sources data 225 (e.g., 13/52), the first reported date 227 (e.g., Jan. 13, 2018 5:11), the last reported date 229 (e.g., May 23, 2018 12:42), the manually applied actions 231 (e.g., Block—Proxy), the indicator creation date 235 (e.g., Aug. 15, 2018), the registration date 242 (e.g., Jan. 16, 2017), the false positive rate 244 (e.g., 50%), or a combination thereof, as described herein. In a particular aspect, the confidence score 107 corresponds to a weighted sum of scores of various properties of the properties 105. For example, the threat report analyzer 150 assigns a first weight to the first seen date 201, a second weight to the last seen date 203, a first score to the first seen date 201 based on the value (e.g., Mar. 12, 2018 4:33) of the first seen date 201, a second score to the last seen date 203 (e.g., May 12, 2018 8:23) based on the value of the last seen date 203, and determines the confidence score 107 based on a weighted sum of the first score and the second score (e.g., the confidence score 107=first weight*first score+second weight*second score).

The threat report analyzer 150 can determine the impact score 109 based on the report volume 205 (e.g., 451), the kill chain phase 207 (e.g., C2), the attack type 209 (e.g., malware), the threat type 211 (e.g., malicious IP), the description keywords 213 (e.g., "scanning"), the keyword tags 215 (e.g., "exfil"), the attribution identifier 217 (e.g., Fluffy Bunny), the additional sources data 225 (e.g., 13/52), the indicator type 233 (e.g., IPv4 address), the targeted 240 (e.g., Yes), or a combination thereof, as described herein. In a particular aspect, the impact score 109 corresponds to a weighted sum of scores of various properties of the properties 105.

The first seen date 201 (e.g., Mar. 12, 2018 4:33) indicates a date (e.g., a timestamp) at which a report indicates that the indicator 103 was first seen (or detected). For example, the network threat report 101 is based on a plurality of reports and a first report (e.g., a user post on a public forum) having an earliest seen date among the plurality of reports indicates that the indicator 103 was detected at the first seen date 201 (e.g., Mar. 12, 2018 4:33). In a particular example, the confidence score 107 is lower for the first seen date 201 that is prior to a threshold first seen date. For example, if the indicator 103 was first seen two years ago, the indicator 103 is less likely to be associated with potential malicious activity.

The last seen date 203 (e.g., May 12, 2018 8:23) indicates a date (e.g., a timestamp) at which a report indicates that the indicator 103 was last seen (or detected). For example, a second report (e.g., a network security publication) having a most recent seen date among the plurality of reports indicates that the indicator 103 was detected at the last seen date 203 (e.g., May 12, 2018 8:23). In a particular example, the confidence score 107 is lower for the last seen date 203 that is prior to a threshold last seen date. For example, if the indicator 103 was last seen a year ago, the indicator 103 is less likely to be associated with potential malicious activity.

The registration date 242 (e.g., Jan. 16, 2017) indicates a date (e.g., a timestamp) at which a report indicates that the indicator 103 was registered with a registration authority. For example, the network threat report 101 is based on a report that indicates that the indicator 103 (e.g., a domain name) was registered on the registration date 242 (e.g., Jan. 16, 2017) with a registration authority (e.g., a domain name registrar). In a particular example, the confidence score 107 is lower for the registration date 242 that is prior to a threshold registration date. For example, if the indicator 103 was registered two years ago, the indicator 103 is less likely to be associated with potential malicious activity.

The first reported date 227 (e.g., Jan. 13, 2018 5:11) indicates a date (e.g., a timestamp) of an earliest report associated with the indicator 103. For example, a first report (e.g., a user post on a public forum) has the earliest date (e.g., the date of the user post on the public forum) among the plurality of reports associated with the indicator 103. In a particular example, the confidence score 107 is lower for the first reported date 227 that is prior to a threshold first reported date. For example, if the indicator 103 was first reported two years ago, the indicator 103 is less likely to be associated with potential malicious activity.

The last reported date 229 (e.g., May 23, 2018 12:42) indicates a date (e.g., a timestamp) of a most recent report associated with the indicator 103. For example, a second report (e.g., a network security publication) having a most recent report date (e.g., the date of the publication) among the plurality of reports associated with the indicator 103. In a particular example, the confidence score 107 is lower for the last reported date 229 that is prior to a threshold last reported date. For example, if the indicator 103 that was last reported a year ago, the indicator 103 is less likely to be associated with potential malicious activity.

In a particular aspect, a report (e.g., a user post on a public forum) has a reported date (e.g., the first reported date 227 or the last reported date 229) at which the report was published (e.g., a date of the post). The report (e.g., the user post) can indicate a seen date (e.g., the first seen date 201 or the last seen date 203) at which the indicator 103 was reportedly detected (e.g., the user indicates in the user post that network traffic logs indicate that the indicator 103 was detected at the seen date). The seen date is less than or equal to the reported date.

The report volume 205 (e.g., 451) indicates a count of reports that indicated that the indicator 103 is associated with malicious activity. For example, the network threat report 101 is based on a plurality of reports from a plurality of sources. To illustrate, the network threat report 101 indicates that a first particular source received a first number of reports (e.g., 51) indicating that the indicator 103 is associated with malicious activity and that a second particular source received a second number of reports (e.g., 400) indicating that the indicator 103 is associated with malicious activity. The threat report analyzer 150 determines the report volume 205 (e.g., 451) based on the first number of reports and the second number of reports (e.g., the report volume 205=the first number of reports+the second number of reports). In a particular aspect, the threat report analyzer 150 derives the report volume 205 (e.g., 2) based on the network threat report 101, the first data 165, the second data 167, or a combination thereof. For example, the threat report analyzer 150 determines a first number (e.g., 1) corresponding to the network threat report 101 from a first source (e.g., the second device 124) indicating that the indicator 103 is associated with malicious activity. The threat report analyzer 150 determines a second number (e.g., 450) corresponding to the first data 165 indicating that a second source (e.g., the third device 126) received the second number of reports from various sources indicating that the indicator 103 is associated with malicious activity. The threat report analyzer 150 determines the report volume 205 (e.g., 451) based on the first number and the second number (e.g., the report volume 205=the first number+the second number). In a particular example, the confidence score 107 is higher for the report volume 205 that is higher than a report volume confidence threshold. For example, if many reports indicate that the indicator 103 is associated with malicious activity, the indicator 103 is more likely to be associated with potential malicious activity. In a particular example, the impact score 109 is higher for the report volume 205 that is higher than a report volume impact threshold. For example, if many reports indicate that the indicator 103 is detected in association with malicious activity, the potential malicious activity associated with indicator 103 is likely to have a more severe impact.

The false positive rate 244 (e.g., 33%) is based on a number of times the indicator 103 is detected (or reported) as associated with non-malicious (or benign) activity and a number of times the indicator 103 is detected (or reported) as associated with malicious activity. For example, the network threat report 101 indicates that the indicator 103 is reportedly associated with malicious activity. The threat report analyzer 150 determines, based on the historical data 121, the network threat report 101, or both, that the indicator 103 has been reported (or detected) as associated with non-malicious activity a first number of times (e.g., 1) and that the indicator 103 has been reported (or detected) as associated with malicious activity a second number of times (e.g., 2). The threat report analyzer 150 determines the false positive rate 244 (e.g., 33%) based on the first number of times and the second number of times (e.g., the false positive rate 244=the first number of times/(the first number of times+the second number of times)). In a particular example, the confidence score 107 is lower for the false positive rate 244 that is higher than a false positive threshold. For example, if the indicator 103 is reported (or detected) more often in association with non-malicious activity, the indicator 103 is less likely to be associated with potential malicious activity.

The description keywords 213 (e.g., "scanning") indicate particular keywords detected in descriptions of the plurality of reports associated with the indicator 103. The keyword tags 215 (e.g., "exfil") indicate particular keywords detected in tags associated with the plurality of reports. In a particular example, the confidence score 107 is higher for the indicator 103 if the lookup data 129 indicates that the description keywords 213 (e.g., "scanning"), the keyword tags 215 (e.g., "exfil"), or a combination thereof, have previously been associated with malicious activity. To illustrate, the confidence score 107 is higher if the keyword tags 215 (e.g., "exfil") indicate a particular activity (e.g., exfiltration or extraction).

The kill chain phase 207 (e.g., C2) indicates a stage of the network threat reportedly associated with the indicator 103 in a kill chain (e.g., a cyber kill chain®). The kill chain includes multiple stages, such as reconnaissance (e.g., probing for a weakness), weaponization (e.g., building a deliverable payload), delivery (e.g., sending the payload, such as a malicious link), exploit (e.g., executing code at a target's computer), installation (e.g., installing malware on a target asset), C2 (e.g., creating a channel to control a system remotely), and actions (e.g., remotely perform a malicious action). In a particular example, the impact score 109 is higher for the kill chain phase 207 that is associated with a higher stage (or phase) in the kill chain. To illustrate, if the indicator 103 is reportedly associated with a particular phase in the kill chain (e.g., C2), the potential malicious activity associated with the indicator 103 is likely to have a more severe impact.

The attribution identifier 217 (e.g., Fluffy Bunny) indicates a perpetrator reportedly associated with the indicator 103. In a particular example, the impact score 109 is higher for the attribution identifier 217 that indicates a perpetrator associated with malicious activity having a more severe impact (e.g., more damaging, more widespread, or both). To illustrate, if the indicator 103 is reportedly associated with a particular attribution identifier that indicates a perpetrator that has previously participated in malicious activity having a more severe impact, the potential malicious activity associated with the indicator 103 is likely to have a more severe impact.

The attack type 209 (e.g., malware) indicates a type of network attack reportedly associated with the indicator 103. The threat type 211 (e.g., malicious IP) indicates a type of network threat reportedly associated with the indicator 103. The indicator type 233 (e.g., IPv4 Address) indicates a type of the indicator 103. For example, the indicator type 233 can include an IP address, a virus signature, an e-mail address, an e-mail subject, a domain name, a URI, a URL, a filename, a MD5 hash, a file path, or a combination thereof. In a particular example, the impact score 109 is higher for the attack type 209, the threat type 211, the indicator type 233, or a combination thereof, associated with malicious activity having a more severe impact (e.g., more damaging, more widespread, or both). To illustrate, if the indicator 103 is reportedly associated with a particular attack type, a particular threat type, a particular indicator type, or a combination thereof, that have previously resulted in malicious activity having a more severe impact, the potential malicious activity associated with the indicator 103 is likely to have a more severe impact.

In a particular implementation, the historical data 121 indicates that malicious activity associated with the kill chain phase 207 (e.g., C2), the attack type 209 (e.g., malware), the threat type 211 (e.g., malicious IP), the description keywords 213 (e.g., "scanning"), the keyword tags 215 (e.g., "exfil"), the indicator type 233, or a combination thereof, has previously been detected and a corresponding impact severity. In this implementation, the threat report analyzer 150 determines the impact score 109 based on the impact severity.

The attribution confidence 219 (e.g., High) indicates a reported likelihood that the indicator 103 is associated with the perpetrator indicated by the attribution identifier 217. In a particular example, the confidence score 107 is higher for the indicator 103 if the attribution confidence 219 is high.

The source count 221 (e.g., 3) indicates a count of sources that have provided at least one report associated with the indicator 103. For example, the second device 124 (or the first source) generates the network threat report 101 indicating that the indicator 103 is reportedly associated with malicious activity. As another example, the third device 126 (or the second source) and the fourth device 128 (or the third source) generate the first data 165 and the second data 167, respectfully, indicating that the indicator 103 is reported associated with malicious activity. The threat report analyzer 150 determines the source count 221 (e.g., 3) based on a count of the sources (e.g., the first source, the second source, and the third source) from which at least one report is received indicating that the indicator 103 is associated with malicious activity. In a particular example, the confidence score 107 is higher for the indicator 103 if the source count 221 (e.g., 3) is higher.

The source reputation score 223 (e.g., high or 10) indicates a level of trust associated with a source. In a particular aspect, the source reputation score 223 indicates a level of trust associated with the sources of the plurality of reports and the network threat report 101 indicates the source reputation score 223. In another aspect, the source reputation score 223 indicates a level of trust associated with a particular source, such as the first source (e.g., the second device 124) of the network threat report 101. In this aspect, the threat report analyzer 150 retrieves the source reputation score 223 from the memory 142. For example, the historical data 121 indicates the source reputation score 223 and the threat report analyzer 150 updates the source reputation score 223 to the value indicated by the historical data 121. In another example, the source reputation score 223 is based on the lookup data 129 (e.g., a configuration setting, default data, the user input 125, or a combination thereof). For example, the lookup data 129 indicates the source reputation score 223 for the first source (e.g., the second device 124). In a particular example, the confidence score 107 is higher for the indicator 103 if the source reputation score 223 (e.g., High) is higher.

The targeted 240 (e.g., Yes) indicates whether the indicator 103 is reportedly associated with a targeted network threat. For example, the indicator 103 can be associated with a network threat that targets a particular organization, a particular person, or both. In a particular example, the impact score 109 is higher for the indicator 103 if the targeted 240 (e.g., Yes) indicates that the indicator 103 is reportedly associated with a targeted network threat. In a particular example, the impact score 109 (e.g., high) is higher for the indicator 103 if the targeted 240 indicates that the indicator 103 is reportedly associated with a targeted network threat directed at a large or sensitive target, such as a hospital, a school, an airport, an electric grid, a government department, a financial institution, or a government official. In this example, the impact score 109 (e.g., medium) is lower for the indicator 103 if the targeted 240 indicates that the indicator 103 is reportedly associated with a targeted network threat directed at a small or obscure target.

In a particular example, the threat report analyzer 150 generates the additional sources data 225 (e.g., 13/52). For example, the threat report analyzer 150 sends requests to additional sources for information regarding the indicator 103. To illustrate, the threat report analyzer 150 sends the first request 161 to the third device 126 (e.g., a second source), the second request 163 to the fourth device 128 (e.g., a third source), or both. The first request 161, the second request 163, or both, include the indicator 103. The threat report analyzer 150 receives data from the additional sources indicating whether the indicator 103 has been detected as reportedly associated with a network threat. For example, the threat report analyzer 150 receives the first data 165 from the third device 126, the second data 167 from the fourth device 128, or both. The threat report analyzer 150 generates (or updates) the additional sources data 225 (e.g., 13/52) indicating a count of the additional sources from which data is received indicating that the indicator 103 has been reported as associated with a network threat (e.g., the additional sources data 225=a count of sources from which data indicating that the indicator 103 has been reported as associated with a network threat is received/a count of sources from which data associated with the indicator 103 is requested). In a particular example, the confidence score 107, the impact score 109, or both, are higher for the indicator 103 if the additional sources data 225 (e.g., 13/52) indicates that a higher count of sources indicate that the indicator 103 is reportedly associated with a network threat.

The manually applied actions 231 (e.g., Block—Proxy) indicate actions (e.g., the action 115) corresponding to the indicator 103 that have been initiated (or recommended) based on a user request. For example, the threat report analyzer 150 receives the network threat report 101, generates the GUI 123 including the indicator 103, provides the GUI 123 to the display device 122, and receives the user input 125 requesting (or recommending) the first actions (e.g., Block—Proxy) associated with the indicator 103. The threat report analyzer 150 determines at least some of the properties 105 subsequent to receiving the user input 125 requesting the first actions. For example, the threat report analyzer 150, in response to receiving the user input 125, determines that the manually applied actions 231 include the first actions (e.g., Block—Proxy). In a particular example, the network threat report 101 indicates that the first source (e.g., the second device 124 or a user of the second device 124) has recommended second actions (e.g., the action 115) corresponding to the indicator 103. The manually applied actions 231 include the first actions, the second actions, or a combination thereof. In a particular aspect, the threat report analyzer 150 initiates performance of the manually applied actions 231 (e.g., Block—Proxy). The threat report analyzer 150 determines (or updates) the confidence score 107, the impact score 109, the overall score 111, or a combination thereof, subsequent to determining the manually applied actions 231. In a particular example, the confidence score 107 is higher for the indicator 103 if the manually applied actions 231 include at least one action corresponding to the indicator 103, a particular action (e.g., Block—Proxy) corresponding to the indicator 103, or both.

The indicator creation date 235 (e.g., Aug. 15, 2018) indicates a date at which the indicator 103 is detected by the first source (e.g., the second device 124). For example, the indicator creation date 235 indicates a date at which the first source (e.g., the second device 124) received (or detected) a report (e.g., a user post on a public forum) indicating that the indicator 103 is associated with malicious activity. In another example, the indicator creation date 235 corresponds to a date at which the network threat report 101 was authored (e.g., a creation date or an update date). In a particular example, the confidence score 107 is higher if the indicator creation date 235 is more recent. To illustrate, the threat report analyzer 150 determines, at a first time, an indicator age based on the indicator creation date 235 (e.g., the indicator age=first time–the indicator creation date 235) and updates the confidence score 107 based on the indicator age. The confidence score 107 is lower for a higher indicator age. In a particular aspect, the threat report analyzer 150 updates (e.g., at particular time intervals) the confidence score 107, the impact score 109, the overall score 111, the position 117, or a combination thereof, of the indicator 103 stored in the response queue 113. The indicator 103 may thus lose priority the longer the indicator 103 is stored in the response queue 113 as higher priority indicators (e.g., the indicator 103) are processed earlier and more indicators are added to the response queue 113.

The internal hits 237 (e.g., 500) indicates a number of times that indicator 103 is detected in network traffic. For example, the historical data 121 includes network logs, system logs, or both, that track network traffic in a particular network portion of the network 102. The particular network portion is considered internal to an organization associated with the first device 140. The last internal hit date 239 (e.g., Apr. 12, 2001) indicates a most recent date at which the indicator 103 is detected in the particular network portion. In a particular aspect, the threat report analyzer 150 determines the action 115 based on at least some of the properties 105, as further described with reference to FIG. 5. For example, the threat report analyzer 150 determines a potential business impact of various actions (e.g., blocking all network traffic associated with the indicator 103 or blocking some network traffic associated with the indicator 103). To illustrate, the potential business impact is higher if the internal hits 237 (e.g., 500) is higher, the last internal hit date 239 (e.g., Apr. 12, 2001) is recent, or both.

The threat report analyzer 150 may refrain from selecting an action as the action 115 in response to determining that the potential business impact of the action is greater than a threshold business impact. In a particular aspect, the threat report analyzer 150 selects the action 115 independently of the potential business impact and adds the action 115 to a particular action queue of multiple action queues based on the potential business impact. For example, the threat report analyzer 150, in response to determining that the potential business impact is greater than an impact threshold, adds the action 115 to a first action queue (e.g., the action queue 119) of actions to be performed in response to an explicit user request. Alternatively, the threat report analyzer 150, in response to determining that the potential business impact is less than or equal to the impact threshold, adds the action 115 to a second action queue (e.g., the action queue 119) of actions to be performed unless an explicit user cancelation is received.

The threat report analyzer 150 thus determines the properties 105 based on the network threat report 101, the first data 165, the second data 167, the historical data 121, or a combination thereof. The properties 105 enable the threat report analyzer 150 to determine a priority (e.g., the overall score 111) of the indicator 103, as described with reference to FIG. 1.

Figure 3:
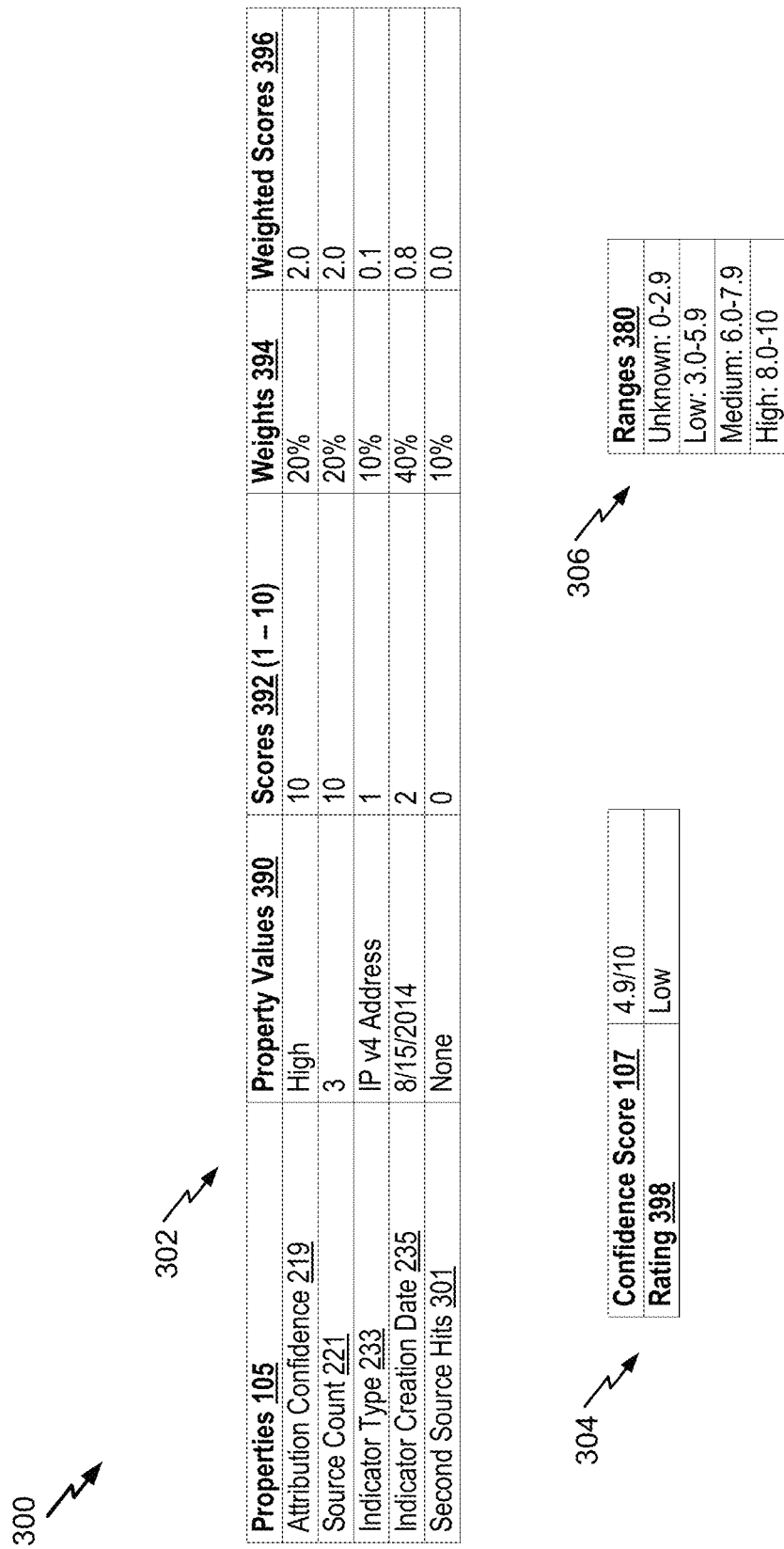
FIG. 3 is a diagram that illustrates an example calculation of a confidence score.

FIG. 3 includes a diagram 300 of an example calculation of the confidence score 107. The diagram 300 includes a table 302. A first column of the table 302 indicates examples of the properties 105. A second column of the table 302 includes property values 390 as illustrative values of the examples of the properties 105 indicated in the first column. The properties 105 include the attribution confidence 219, the source count 221, the indicator type 233, the indicator creation date 235, and second source hits 301. The second source hits 301 indicate a number of times that the indicator 103 is detected as reported by a second source (e.g., a trusted source). For example, the additional sources data 225 of FIG. 2 includes the second source hits 301. The second source hits 301 (e.g., None) indicates a number of times (e.g., 0) that the indicator 103 is indicated as reported in the first data 165 as associated with a network threat.

The threat report analyzer 150 determines scores 392 for the properties 105. For example, the threat report analyzer 150 determines a first score (e.g., 10), a second score (e.g., 10), a third score (e.g., 1), a fourth score (e.g., 2), and a fifth score (e.g., 0) in response to determining that the attribution confidence 219 has a first value (e.g., High), the source count 221 has a second value (e.g., 3), the indicator type 233 has a third value (e.g., IPv4 Address), the indicator creation date 235 has a fourth value (e.g., Aug. 15, 2014) and that the second source hits 301 has a fifth value (e.g., None), respectively. In a particular aspect, the threat report analyzer 150 determines the scores 392 based on the lookup data 129 (e.g., user input, configuration settings, default values, or a combination thereof) of FIG. 1. For example, the lookup data 129 indicates a first score for a particular property (e.g., the keyword tags 215) having a particular value (e.g., "exfil"). The threat report analyzer 150 determines the confidence score 107 based on the first score for the particular property. For example, the threat report analyzer 150 determines that the attribution confidence 219 has the first score (e.g., 10) in response to determining that the attribution confidence 219 has the first value (e.g., High) and that the lookup data 129 indicates that the first score (e.g., 10) is to be assigned to the attribution confidence 219 having the first value (e.g., High). A third column of the table 302 includes illustrative values of the scores 392 for the examples of the properties 105 indicated in the first column.

The threat report analyzer 150 determines weights 394 for the properties 105. For example, the threat report analyzer 150 assigns a first weight (e.g., 20%), a second weight (e.g., 20%), a third weight (e.g., 10%), a fourth weight (e.g., 40%), and a fifth weight (e.g., 10%) to the attribution confidence 219, the source count 221, the indicator type 233, the indicator creation date 235, and the second source hits 301, respectively. In a particular aspect, the threat report analyzer 150 determines the weights 394 based on the lookup data 129 indicating that the attribution confidence 219, the source count 221, the indicator type 233, the indicator creation date 235, and the second source hits 301 are to be assigned the first weight (e.g., 20%), the second weight (e.g., 20%), the third weight (e.g., 10%), the fourth weight (e.g., 40%), and the fifth weight (e.g., 10%), respectively. A fourth column of the table 302 includes illustrative values of the weights 394 for the examples of the properties 105 indicated in the first column. The calculation of the confidence score 107 can thus be customized for particular properties by designating (e.g., in the lookup data 129) particular weights for the properties and by designating (e.g., in the lookup data 129) particular scores for particular values of the properties.

The threat report analyzer 150 determines weighted scores 396 for the properties 105 based on the scores 392 and the weights 394. For example, the threat report analyzer 150 assigns a first weighted score (e.g., the first score*the first weight), a second weighted score (e.g., the second score*the second weight), a third weighted score (e.g., the third score*the third weight), a fourth weighted score (e.g., the fourth score*the fourth weight), and a fifth weighted score (e.g., the fifth score*the fifth weight) to the attribution confidence 219, the source count 221, the indicator type 233, the indicator creation date 235, and the second source hits 301, respectively. A fifth column of the table 302 includes illustrative values of the weighted scores 396 for the examples of the properties 105 indicated in the first column.

The threat report analyzer 150 determines the confidence score 107 (e.g., 4.9/10) for the properties 105 based on the weighted scores 396. For example, the threat report analyzer 150 determines the confidence score 107 (e.g., 4.9/10) based on a sum of the weighted scores 396 (e.g., the confidence score 107=the first weighted score+the second weighted score+the third weighted score+the fourth weighted score+ the fifth weighted score) assigned to the attribution confidence 219, the source count 221, the indicator type 233, the indicator creation date 235, and the second source hits 301.

The diagram 300 includes a table 304. The table 304 indicates an illustrative value (e.g., 4.9/10) for the confidence score 107 corresponding to the examples of the properties 105 indicated in the table 302. The threat report analyzer 150 assigns a rating 398 to the confidence score 107. Ranges 380 of the confidence score 107 correspond to various ratings. In a particular aspect, the lookup data 129 indicates the ranges 380. The diagram 300 includes a table 306 indicating illustrative values for the ranges 380. The table 306 indicates that a first rating (e.g., unknown), a second rating (e.g., low), a third rating (e.g., medium), and a fourth rating (e.g., high) correspond to a first range (e.g., 0-2.9), a second range (e.g., 3.0-5.9), a third range (e.g., 6.0-7.9), and a fourth range (e.g., 8.0-10), respectively. The threat report analyzer 150 determines that the confidence score 107 corresponds to the second rating (e.g., low) in response to determining that the second range (e.g., 3.0-5.9) includes the confidence score 107 (e.g., 4.9). The threat report analyzer 150 thus determines the confidence score 107 based on at least some of the properties 105.

Figure 4:
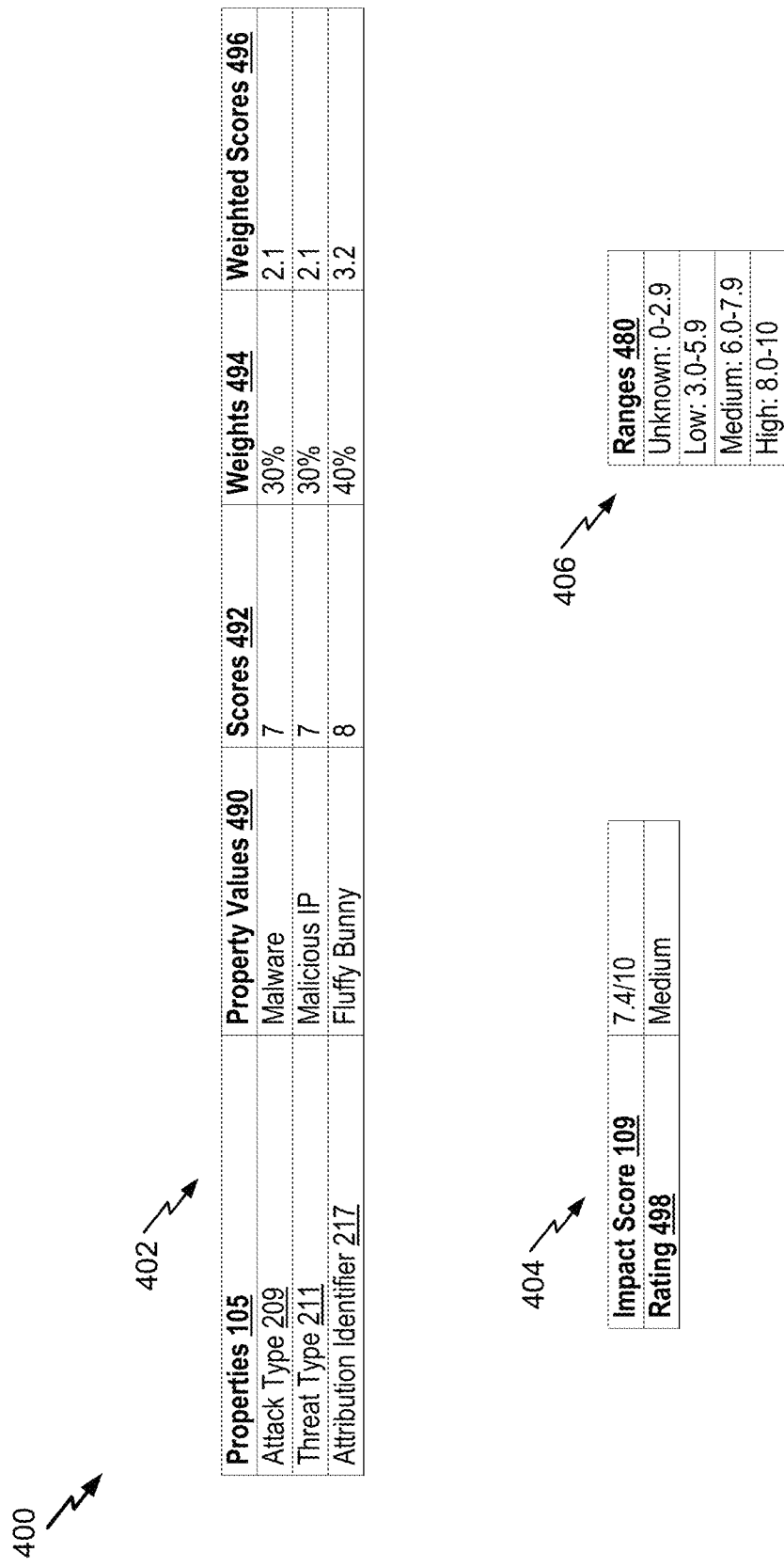
FIG. 4 is a diagram that illustrates an example calculation of an impact score.

FIG. 4 includes a diagram 400 of an example calculation of the impact score 109. The diagram 400 includes a table 402. A first column of the table 402 indicates examples of the properties 105. A second column of the table 402 includes property values 490 as illustrative values of the examples of the properties 105 indicated in the first column. The properties 105 include the attack type 209, the threat type 211, and the attribution identifier 217.

The threat report analyzer 150 determines the impact score 109 based on weighted scores 496. First, the threat report analyzer 150 determines scores 492 for the properties 105. For example, the threat report analyzer 150 determines a first score (e.g., 7), a second score (e.g., 7), and a third score (e.g., 8) in response to determining that the attack type 209 has a first value (e.g., malware), the threat type 211 has a second value (e.g., malicious IP), and the attribution identifier 217 has a third value (e.g., Fluffy Bunny), respectively. In a particular aspect, the threat report analyzer 150 determines the scores 492 based on the lookup data 129 of FIG. 1. For example, the lookup data 129 indicates a second score for a particular property (e.g., the keyword tags 215) having a particular value (e.g., "exfil"). The threat report analyzer 150 determines the impact score 109 based on the second score for the particular property. The second score to determine the impact score 109 can be the same as or distinct from a first score (indicated by the lookup data 129) to determine the confidence score 107. In a particular example, the threat report analyzer 150 determines that the attack type 209 has the first score (e.g., 7) in response to determining that the attack type 209 has the first value (e.g., malware) and that the lookup data 129 indicates that the first score (e.g., 7) is to be assigned to the attack type 209 having the first value (e.g., malware). A third column of the table 402 includes illustrative values of the scores 492 for the examples of the properties 105 indicated in the first column.

The threat report analyzer 150 determines weights 494 for the properties 105. For example, the threat report analyzer 150 assigns a first weight (e.g., 30%), a second weight (e.g., 30%), and a third weight (e.g., 40%) to the attack type 209, the threat type 211, and the attribution identifier 217, respectively. In a particular aspect, the threat report analyzer 150 determines the weights 494 based on the lookup data 129 indicating that the attack type 209, the threat type 211, and the attribution identifier 217 are to be assigned the first weight (e.g., 30%), the second weight (e.g., 30%), and the third weight (e.g., 40%), respectively. A fourth column of the table 402 includes illustrative values of the weights 494 for the examples of the properties 105 indicated in the first column. The calculation of the impact score 109 can thus be customized for particular properties by designating (e.g., in the lookup data 129) particular weights for the properties and by designating (e.g., in the lookup data 129) particular scores for particular values of the properties.

The threat report analyzer 150 determines the weighted scores 496 for the properties 105 based on the scores 492 and the weights 494. For example, the threat report analyzer 150 assigns a first weighted score (e.g., the first score*the first weight), a second weighted score (e.g., the second score*the second weight), and a third weighted score (e.g., the third score*the third weight) to the attack type 209, the threat type 211, and the attribution identifier 217, respectively. A fifth column of the table 402 includes illustrative values of the weighted scores 496 for the examples of the properties 105 indicated in the first column.

The threat report analyzer 150 determines the impact score 109 (e.g., 7.4/10) for the properties 105 based on the weighted scores 496. For example, the threat report analyzer 150 determines the impact score 109 (e.g., 7.4/10) based on a sum of the weighted scores 496 (e.g., the impact score 109=the first weighted score+the second weighted score+the third weighted score) assigned to the attack type 209, the threat type 211, and the attribution identifier 217.

The diagram 400 includes a table 404. The table 404 indicates an illustrative value (e.g., 7.4/10) for the impact score 109 corresponding to the examples of the properties 105 indicated in the table 402. The threat report analyzer 150 assigns a rating 498 to the impact score 109. Ranges 480 of the impact score 109 correspond to various ratings. In a particular aspect, the lookup data 129 indicates the ranges 480. The diagram 400 includes a table 406 indicating illustrative values for the ranges 480. The table 406 indicates that a first rating (e.g., unknown), a second rating (e.g., low), a third rating (e.g., medium), and a fourth rating (e.g., high) correspond to a first range (e.g., 0-2.9), a second range (e.g., 3.0-5.9), a third range (e.g., 6.0-7.9), and a fourth range (e.g., 8.0-10), respectively. For example, the threat report analyzer 150 determines that the impact score 109 corresponds to the third rating (e.g., medium) in response to determining that the third range (e.g., 6.0-7.9) includes the impact score 109 (e.g., 7.4). The threat report analyzer 150 thus determines the impact score 109 based on at least some of the properties 105.

FIG. 5 includes a diagram 500 of examples 510-530 of the properties 105 and the action 115 corresponding to particular property values 540-560. In a first example 510, the property values 540 indicate that the properties 105 include the indicator type 233 having a first value (e.g., IPv4 address), the internal hits 237 having a second value (e.g., 0), the confidence score 107 having a third value (e.g., 7.3), and the impact score 109 having a fourth value (e.g., 7.1).

In the first example 510, the threat report analyzer 150 determines that the action 115 associated with the indicator 103 has a low potential business impact because the second value (e.g., 0) of the internal hits 237 is below an internal hit threshold (e.g., 10). The threat report analyzer 150 determines that the third value (e.g., 7.3) of the confidence score 107 corresponds to the rating 398 (e.g., a medium rating) based on the ranges 380 of FIG. 3 and that the fourth value (e.g., 7.1) of the impact score 109 corresponds to the rating 498 (e.g., a medium rating) based on the ranges 480 of FIG. 4.

In a particular aspect, the threat report analyzer 150 selects more aggressive actions as the action 115 in response to determining that a first criterion is satisfied. In a particular implementation, the threat report analyzer 150 determines that the first criterion is satisfied in response to determining that the action 115 has a low potential business impact, that the confidence score 107 (e.g., 7.3) satisfies a confidence threshold (e.g., greater than or equal to 6.0), that the impact score 109 (e.g., 7.1) satisfies an impact threshold (e.g., greater than or equal to 6.0), or a combination thereof. In a particular implementation, the lookup data 129 of FIG. 1 indicates the first criterion to be satisfied for selection of more aggressive actions as the action 115. The threat report analyzer 150, in response to determining that the first criterion is satisfied, sets the action 115 to include blocking proxy traffic and email traffic associated with the indicator 103 and monitoring proxy traffic, email traffic, reverse proxy (RP) traffic, virtual private network (VPN) traffic, and external web logs associated with the indicator 103.

In a second example 520, property values 550 indicate that the properties 105 include the indicator type 233 having a first value (e.g., Domain Name), the internal hits 237 having a second value (e.g., 100), the last internal hit date 239 having a third value (e.g., 04/2016), the confidence score 107 having a fourth value (e.g., 5.8), and the impact score 109 having a fifth value (e.g., 7.5). In the second example 520, the threat report analyzer 150 determines that the second value (e.g., 100) of the internal hits 237 indicates a high business impact because the second value is greater than the internal hit threshold (e.g., 10) and that the third value (e.g., 04/2016) indicates a low business impact because the third value is prior to a hit threshold date (e.g., more than a year old). The threat report analyzer 150 determines, based on the second value and the third value, that the action 115 associated with the indicator 103 has a medium potential business impact. The threat report analyzer 150 determines that the fourth value (e.g., 5.8) of the confidence score 107 corresponds to the rating 398 (e.g., a low rating) based on the ranges 380 of FIG. 3 and that the fifth value (e.g., 7.5) of the impact score 109 corresponds to the rating 498 (e.g., a medium rating) based on the ranges 480 of FIG. 4

In a particular aspect, the threat report analyzer 150 selects medium-aggressive actions as the action 115 in response to determining that a second criterion is satisfied. In a particular implementation, the threat report analyzer 150 determines that the second criterion is satisfied in response to determining that the action 115 has a medium potential business impact, that the confidence score 107 (e.g., 5.8) fails to satisfy a confidence threshold (e.g., less than 6.0), that the impact score 109 (e.g., 7.5) satisfies an impact threshold (e.g., greater than or equal to 6.0), or a combination thereof. In another implementation, the threat report analyzer 150 determines that the second criterion is satisfied in response to determining that the action 115 has a medium potential business impact and that the impact score 109 (e.g., 7.5) satisfies an impact threshold (e.g., greater than or equal to 6.0). In a particular implementation, the lookup data 129 of FIG. 1 indicates the second criterion to be satisfied for selection of medium-aggressive actions as the action 115. The threat report analyzer 150, in response to determining that the second criterion is satisfied, sets the action 115 to include blocking proxy traffic associated with the indicator 103 and monitoring proxy traffic, email traffic, RP traffic, virtual private network (VPN) traffic, and external web logs associated with the indicator 103.

In a third example 530, the property values 560 indicate that the properties 105 include the indicator type 233 having a first value (e.g., IPv4 address), the internal hits 237 having a second value (e.g., 10,000), the last internal hit date 239 having a third value (e.g., 2 days ago), the confidence score 107 having a fourth value (e.g., 2.8), and the impact score 109 having a fifth value (e.g., 1.7). In the third example 530, the threat report analyzer 150 determines that the second value (e.g., 10,000) of the internal hits 237 indicates a high business impact because the second value is greater than the internal hit threshold (e.g., 10) and that the third value (e.g., 2 days ago) indicates a high business impact because the third value is subsequent to a hit threshold date (e.g., one week ago). The threat report analyzer 150 determines, based on the second value and the third value that the action 115 associated with the indicator 103 has a high potential business impact.

In a particular aspect, the threat report analyzer 150 selects non-aggressive actions as the action 115 in response to determining that a third criterion is satisfied. In a particular implementation, the threat report analyzer 150 determines that the third criterion is satisfied in response to determining that the action 115 has a high potential business impact, that the confidence score 107 (e.g., 2.8) fails to satisfy a confidence threshold (e.g., less than 6.0), and that the impact score 109 (e.g., 1.7) fails to satisfy an impact threshold (e.g., less than 6.0), or a combination thereof. In a particular implementation, the lookup data 129 of FIG. 1 indicates the third criterion to be satisfied for selection of non-aggressive actions as the action 115. The threat report analyzer 150, in response to determining that the third criterion is satisfied, sets the action 115 to indicate that no actions are to be taken. In another example, the threat report analyzer 150, in response to determining that the third criterion is satisfied, sets the action 115 to include monitoring proxy traffic, email traffic, RP traffic, virtual private network (VPN) traffic, and external web logs associated with the indicator 103. In a particular implementation, the threat report analyzer 150, in response to determining that the third criterion is satisfied, selects aggressive or medium aggressive actions as the action 115 and adds the action 115 in a first action queue (e.g., the action queue 119) of actions to be performed in response to user approval.

It should be understood that the examples included in FIG. 5 are illustrative and not meant to be limiting. The threat report analyzer 150 can select various actions to be performed based on various properties associated with the indicator 103. Although various thresholds have been described with respect to FIGS. 1-5, the system 100 may include multiple thresholds corresponding to a particular property of the properties 105.

Figure 6:
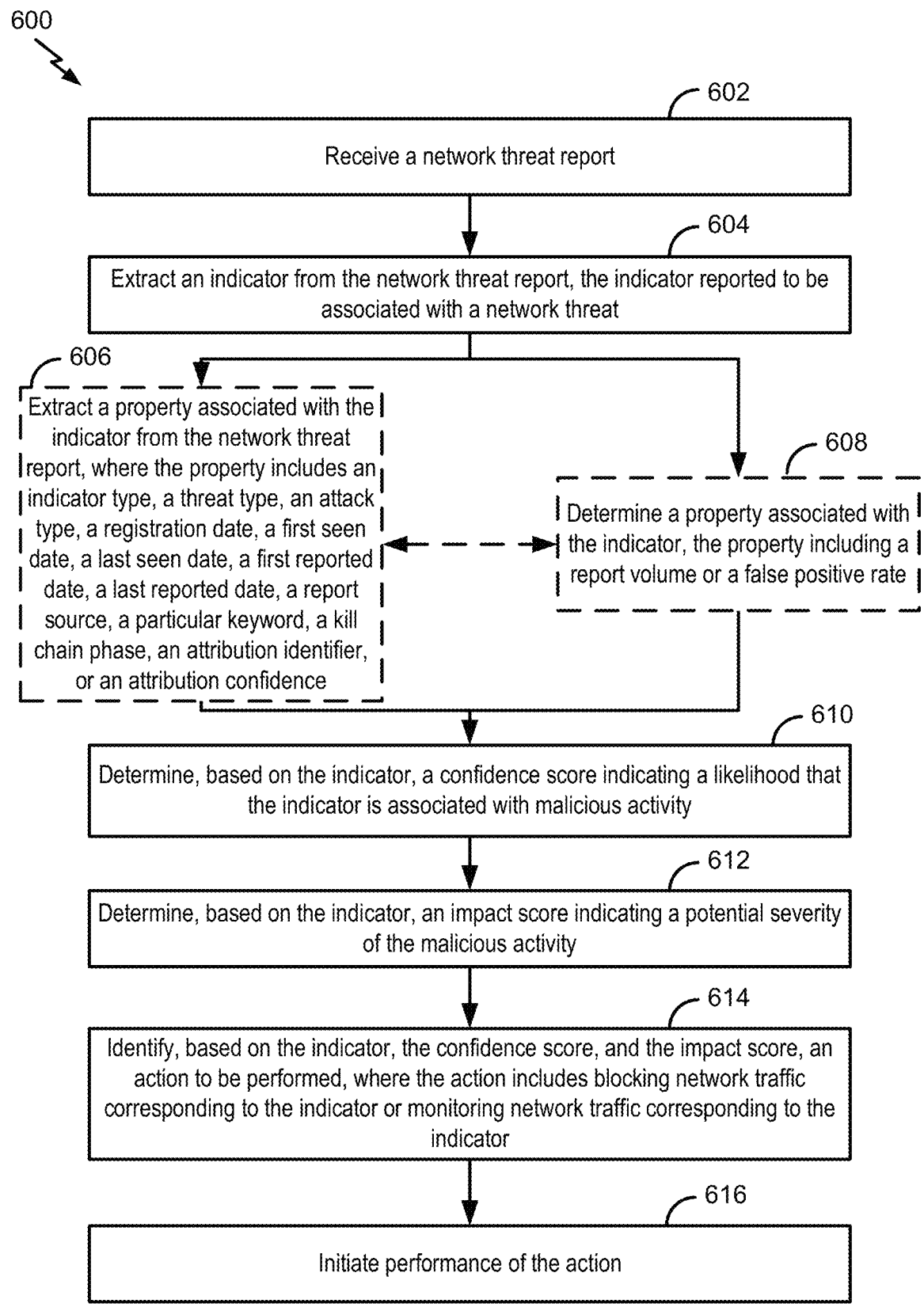
FIG. 6 is a flow chart that illustrates an example of a method of network threat indicator extraction and response.

FIG. 6 is a flowchart of a method 600 of network threat indicator extraction and response. The method 600 can be performed by one or more of the threat report analyzer 150, the first device 140, or the system 100 of FIG. 1.

The method 600 includes receiving a network threat report, at 602. For example, the threat report analyzer 150 of FIG. 1 receives the network threat report 101, as described with reference to FIG. 1.

The method 600 also includes extracting an indicator from the network threat report, at 604. For example, the threat report analyzer 150 of FIG. 1 extracts the indicator 103 from the network threat report 101. The indicator 103 is reported to be associated with a network threat.

The method 600 can include extracting a property associated with the indicator from the network threat report, at 606. For example, the threat report analyzer 150 of FIG. 1 extracts the indicator type 233, the threat type 211, the attack type 209, the registration date 242, the first seen date 201, the last seen date 203, the first reported date 227, the last reported date 229, the source reputation score 223 of the first source (e.g., the second device 124), the description keywords 213, the kill chain phase 207, the attribution identifier 217, the attribution confidence 219, or a combination thereof, from the network threat report 101, as described with reference to FIG. 1-2.

Alternatively or in addition, the method 600 can include determining a property associated with the indicator, at 608. For example, the threat report analyzer 150 of FIG. 1 determines the report volume 205, the false positive rate 244, or both, as described with reference to FIGS. 1-2.

The method 600 further includes determining, based on the indicator, a confidence score indicating a likelihood that the indicator is associated with malicious activity, at 610. For example, the threat report analyzer 150 of FIG. 1 determines the confidence score 107 based on the indicator 103, as further described with reference to FIGS. 1 and 3. To illustrate, the threat report analyzer 150 determines the confidence score 107 based on at least one of the indicator type 233, the threat type 211, the attack type 209, the registration date 242, the first seen date 201, the last seen date 203, the first reported date 227, the last reported date 229, the source reputation score 223 of the first source (e.g., the second device 124), the description keywords 213, the kill chain phase 207, the attribution identifier 217, the attribution confidence 219, the report volume 205, or the false positive rate 244, as described with reference to FIGS. 1-3. The confidence score 107 indicates a likelihood that the indicator 103 is associated with malicious activity.

The method 600 also includes determining, based on the indicator, an impact score indicating a potential severity of the malicious activity, at 612. For example, the threat report analyzer 150 of FIG. 1 determines the impact score 109 based on the indicator 103, as further described with reference to FIGS. 1 and 4. To illustrate, the threat report analyzer 150 determines the impact score 109 based on at least one of the indicator type 233, the threat type 211, the attack type 209, the registration date 242, the first seen date 201, the last seen date 203, the first reported date 227, the last reported date 229, the source reputation score 223 of the first source (e.g., the second device 124), the description keywords 213, the kill chain phase 207, the attribution identifier 217, the attribution confidence 219, the report volume 205, or the false positive rate 244, as described with reference to FIGS. 1-2 and 4. The impact score 109 indicates a potential severity of the malicious activity.

The method 600 further includes identifying, based on the indicator, the confidence score, and the impact score, an action to be performed, at 614. For example, the threat report analyzer 150 of FIG. 1 identifies the action 115 based on the indicator 103, the confidence score 107, and the impact score 109, as described with reference to FIG. 1. The action 115 includes blocking network traffic corresponding to the indicator 103, monitoring network traffic corresponding to the indicator 103, or both, as described with reference to FIGS. 1 and 5.

The method 600 also includes initiating performance of the action 115, at 616. For example, the threat report analyzer 150 of FIG. 1 initiates performance of the action 115, as described with reference to FIG. 1. To illustrate, the threat report analyzer 150 can perform the action 115 independently of (e.g., in the absence of) user input indicating that the action 115 is to be performed.

The method 600 thus enables the action 115 corresponding to the indicator 103 to be identified based on the likelihood that the indicator 103 is associated with malicious activity and the potential severity of the malicious activity. The action 115 can be performed without receiving any user input indicating that the action 115 is to be performed. Earlier performance of the action 115 enables prevention of the corresponding malicious activity.

Figure 7:
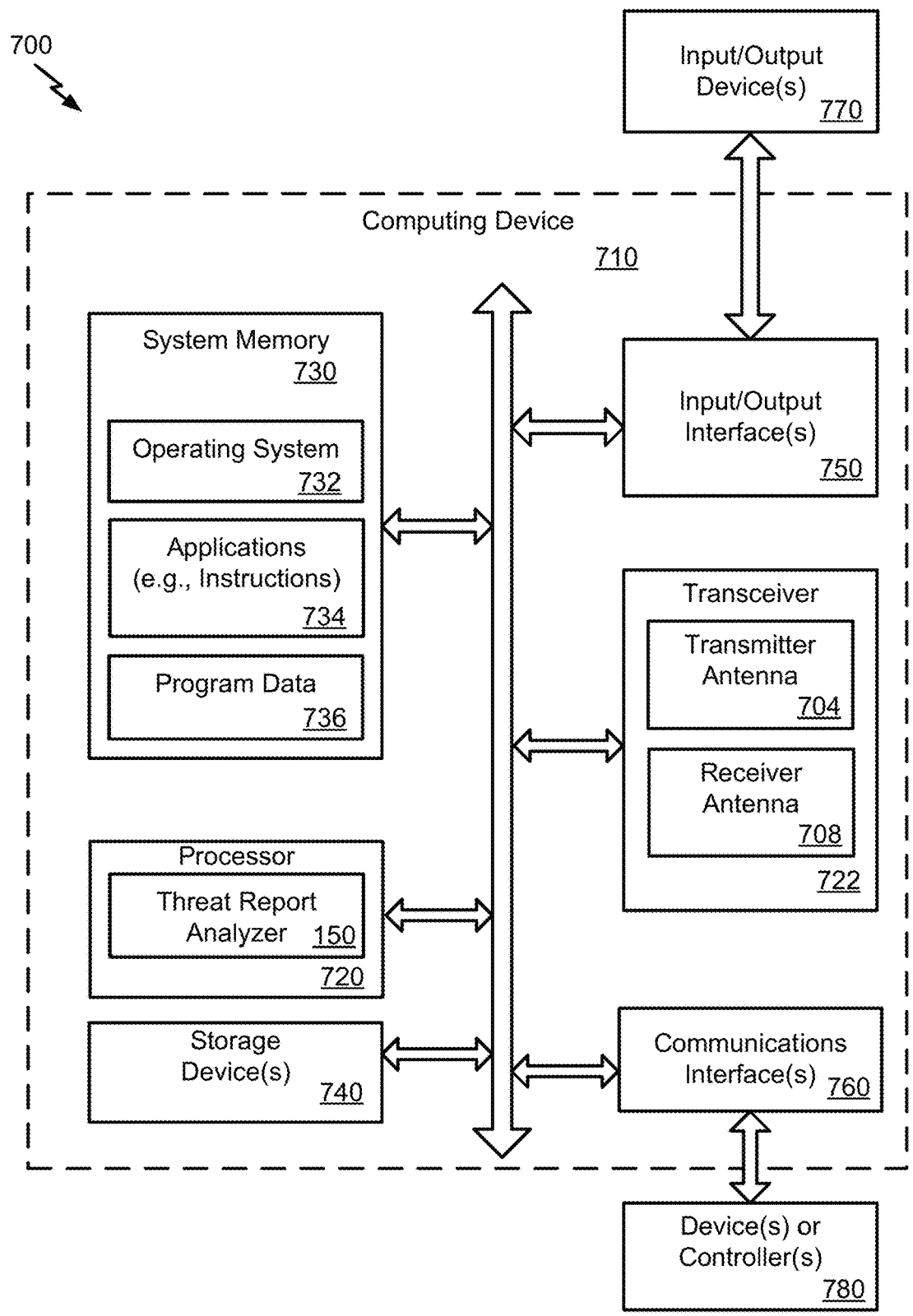
FIG. 7 is a block diagram that depicts a computing environment including a computing device configured to support aspects of computer-implemented methods and computer-executable program instructions (or code) according to the present disclosure.

FIG. 7 is an illustration of a block diagram of a computing environment 700 including a computing device 710 configured to support aspects of computer-implemented methods and computer-executable program instructions (or code) according to the present disclosure. For example, the computing device 710, or portions thereof, is configured to execute instructions to initiate, perform, or control one or more operations described with reference to FIGS. 1-6.

The computing device 710 includes the transceiver 722. The transceiver 722 includes a transmitter antenna 704 and a receiver antenna 708. The computing device 710 includes a processor 720. In a particular aspect, the processor 720 includes the threat report analyzer 150. The processor 720 is configured to communicate with system memory 730, one or more storage devices 740, one or more input/output interfaces 750, one or more communication interfaces 760, or a combination thereof. The system memory 730 includes volatile memory devices (e.g., random access memory (RAM) devices), nonvolatile memory devices (e.g., read-only memory (ROM) devices, programmable read-only memory, and flash memory), or both. The system memory 730 stores an operating system 732, which may include a basic input/output system for booting the computing device 710 as well as a full operating system to enable the computing device 710 to interact with users, other programs, and other devices. The system memory 730 stores system (program) data 736. In a particular aspect, the memory 142 of FIG. 1 includes the system memory 730, the one or more storage devices 740, or a combination thereof.

The system memory 730 includes one or more applications 734 executable by the processor 720. As an example, the one or more applications 734 include instructions executable by the processor 720 to initiate, control, or perform one or more operations described with reference to FIGS. 1-6. To illustrate, the one or more applications 734 include instructions executable by the processor 720 to initiate, control, or perform one or more operations described with reference to the threat report analyzer 150.

The processor 720 is configured to communicate with one or more storage devices 740. For example, the one or more storage devices 740 include nonvolatile storage devices, such as magnetic disks, optical disks, or flash memory devices. In a particular example, the storage devices 740 include both removable and non-removable memory devices. The storage devices 740 are configured to store an operating system, images of operating systems, applications, and program data. In a particular aspect, the system memory 730, the storage devices 740, or both, include tangible computer-readable media. In a particular aspect, one or more of the storage devices 740 are external to the computing device 710.

The processor 720 is configured to communicate with one or more input/output interfaces 750 that enable the computing device 710 to communicate with one or more input/output devices 770 to facilitate user interaction. In a particular aspect, the input/output interfaces 750 include the input interface 144, the output interface 148 of FIG. 1, or both. The processor 720 is configured to detect interaction events based on user input received via the input/output interfaces 750. Additionally, the processor 720 is configured to send a display to the display device 122 of FIG. 1 via the input/output interfaces 750. The processor 720 is configured to communicate with devices or controllers 780 via the one or more communication interfaces 760. For example, the one or more communication interfaces 760 include the communication interface 146 of FIG. 1. In an illustrative example, a non-transitory computer-readable storage medium (e.g., the system memory 730) includes instructions that, when executed by a processor (e.g., the processor 720), cause the processor to initiate, perform, or control operations. The operations include one or more operations described with reference to FIGS. 1-6.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
a communication interface configured to receive a network threat report; and
a processor configured to:
extract an indicator from the network threat report, the indicator reported to be associated with a network threat;
determine, based on the indicator, a confidence score indicating a likelihood that the indicator is associated with malicious activity;
determine, based on the indicator, an impact score indicating a potential severity of the malicious activity; and
perform an action based on the indicator, the confidence score, and the impact score, wherein the action includes blocking network traffic corresponding to the indicator or monitoring network traffic corresponding to the indicator.

2. The device of claim 1, wherein the indicator includes an internet protocol (IP) address, an e-mail address, an e-mail subject, a domain name, a uniform resource identifier (URI), a uniform resource locator (URL), a filename, a message digest algorithm 5 (MD5) hash, a file path, or a combination thereof.

3. The device of claim 1, wherein the confidence score is based on one or more properties associated with the indicator, the one or more properties including a first seen date, a last seen date, an indicator age, a registration date, a first reported date, a last reported date, a report source, a source reputation score, a report volume, an attribution confidence, a particular keyword, or a false positive rate.

4. The device of claim 1, wherein the impact score is based on one or more properties associated with the indicator, the one or more properties including an indicator type, a report volume, a kill chain phase, a threat type, an attack type, a particular keyword, or an attribution identifier.

5. The device of claim 1, wherein the processor is further configured to add the indicator to a position in a response queue, the position based on the confidence score and the impact score.

6. The device of claim 5, further comprising an output interface configured to be coupled to a display device, wherein the processor is further configured to, prior to performance of the action:
generate a graphical user interface (GUI) based on the response queue, the GUI indicating the position of the indicator in the response queue; and
provide the GUI via the output interface to the display device.

7. A method comprising:
receiving a network threat report at a device;
extracting, at the device, an indicator from the network threat report, the indicator reported to be associated with a network threat;
determining, based on the indicator, a confidence score indicating a likelihood that the indicator is associated with malicious activity;
determining, based on the indicator, an impact score indicating a potential severity of the malicious activity; and
performing, at the device, an action based on the indicator, the confidence score, and the impact score, wherein the action includes blocking network traffic corresponding to the indicator or monitoring network traffic corresponding to the indicator.

8. The method of claim 7, wherein the indicator includes an internet protocol (IP) address, a virus signature, an e-mail address, an e-mail subject, a domain name, a uniform resource identifier (URI), a uniform resource locator (URL), a filename, a message digest algorithm 5 (MD5) hash, a file path, or a combination thereof.

9. The method of claim 7, wherein the confidence score and the impact score are based on one or more properties associated with the indicator.

10. The method of claim 7, further comprising determining a property associated with the indicator based on the network threat report, wherein the property includes an indicator type, a threat type, an attack type, a first seen date, a last seen date, a first reported date, a last reported date, a report source, a particular keyword, a kill chain phase, an attribution identifier, or an attribution confidence, and wherein at least one of the confidence score or the impact score is based on the property.

11. The method of claim 7, further comprising determining a property associated with the indicator, the property including a report volume or a false positive rate, wherein the report volume includes a count of reports indicating that the indicator is associated with the malicious activity, wherein the false positive rate is based on a first number of times the indicator is detected as associated with non-malicious activity and a second number of times the indicator is detected as associated with malicious activity, and wherein at least one of the confidence score or the impact score is based on the property.

12. The method of claim 7, wherein the confidence score is based on one or more properties associated with the indicator, the one or more properties including a first seen date, a last seen date, an indicator age, a first reported date, a last reported date, a report source, a source reputation score, a report volume, an attribution confidence, a particular keyword, or a false positive rate.

13. The method of claim 7, wherein the impact score is based on one or more properties associated with the indicator, the one or more properties including an indicator type, a report volume, a kill chain phase, a threat type, an attack type, a particular keyword, or an attribution identifier.

14. The method of claim 7, further comprising adding, at the device, the indicator to a position in a response queue, the position based on the confidence score and the impact score.

15. The method of claim 14, further comprising, prior to performance of the action:
generating, at the device, a graphical user interface (GUI) based on the response queue, the GUI indicating the position of the indicator in the response queue; and
providing the GUI from the device to a display device.

16. The method of claim 7, further comprising:

generating, at the device, a graphical user interface (GUI) indicating the action; and providing the GUI from the device to a display device, wherein performance of the action is initiated in response to receiving a user input indicating that the action is to be performed.

17. The method of claim 7, wherein the performing the action comprises scheduling the action.

18. The method of claim 7, wherein the performing the action comprises performance of the action independent of receipt of user input authorizing performance of the action.

19. A non-transitory computer-readable storage device storing instructions that, when executed by a processor, cause the processor to perform operations comprising:

receiving a network threat report;

extracting an indicator from the network threat report, the indicator reported to be associated with a network threat;

determining, based on the indicator, a confidence score indicating a likelihood that the indicator is associated with malicious activity;

determining, based on the indicator, an impact score indicating a potential severity of the malicious activity; and performing an action identified based on the indicator, the confidence score, and the impact score, wherein the action includes blocking network traffic corresponding to the indicator or monitoring network traffic corresponding to the indicator.

20. The non-transitory computer-readable storage device of claim 19, wherein the operations further comprise extracting a property associated with the indicator from the network threat report, wherein at least one of the confidence score or the impact score is based on the property, and wherein the property includes an indicator type, a threat type, an attack type, a registration date, a first seen date, a last seen date, a first reported date, a last reported date, a report source, a particular keyword, a kill chain phase, an attribution identifier, or an attribution confidence.

* * * * *